(12) United States Patent
Rajic

(10) Patent No.: US 8,671,086 B2
(45) Date of Patent: Mar. 11, 2014

(54) PREFETCHING CONTENT OF A DIRECTORY BY EXECUTING A DIRECTORY ACCESS COMMAND

(75) Inventor: Zoran Rajic, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 13/039,423

(22) Filed: Mar. 3, 2011

(65) Prior Publication Data

US 2012/0226872 A1 Sep. 6, 2012

(51) Int. Cl.
*G06F 17/30* (2006.01)
(52) U.S. Cl.
USPC .......................................... 707/705; 707/758
(58) Field of Classification Search
USPC .................................. 707/705, 758
See application file for complete search history.

(56) References Cited

U.S. PATENT DOCUMENTS

| | | | | |
|---|---|---|---|---|
| 5,737,747 | A * | 4/1998 | Vishlitzky et al. | 711/118 |
| 5,991,757 | A * | 11/1999 | Dahl et al. | 703/23 |
| 6,314,431 | B1 | 11/2001 | Gornish | |
| 7,966,289 | B2 * | 6/2011 | Lu et al. | 707/640 |
| 8,244,903 | B2 * | 8/2012 | Bono | 709/232 |
| 8,359,439 | B2 * | 1/2013 | Nakano et al. | 711/162 |
| 2005/0021916 | A1 | 1/2005 | Loafman | |
| 2005/0071617 | A1 | 3/2005 | Zimmer | |
| 2009/0055399 | A1* | 2/2009 | Lu et al. | 707/10 |
| 2009/0158023 | A1 | 6/2009 | Kern | |
| 2010/0146254 | A1* | 6/2010 | Park et al. | 713/1 |

OTHER PUBLICATIONS

Huizinga et al., Implementation of Informed Prefetching and Caching in Linux, 2000 (6 pages).

* cited by examiner

*Primary Examiner* — Kim Nguyen

(57) ABSTRACT

In response to a request to access a directory, a directory access command is invoked and executed, where the executed directory access command accesses the directory and prefetches content of the directory.

18 Claims, 2 Drawing Sheets

PREFETCHING CONTENT OF A DIRECTORY BY EXECUTING A DIRECTORY ACCESS COMMAND

BACKGROUND

A system can store relatively large amounts of data in persistent storage media (such as disk-based storage media or other types of persistent storage media) that may be accessed during operation of the system. Although typical persistent storage media have relatively large storage capacities, they are often associated with relatively slow access speeds. Having to obtain data from relatively slow storage media in response to each request to access data can result in reduced system performance.

BRIEF DESCRIPTION OF THE DRAWINGS

Some embodiments are described with respect to the following figures.

DETAILED DESCRIPTION

Figure 1:
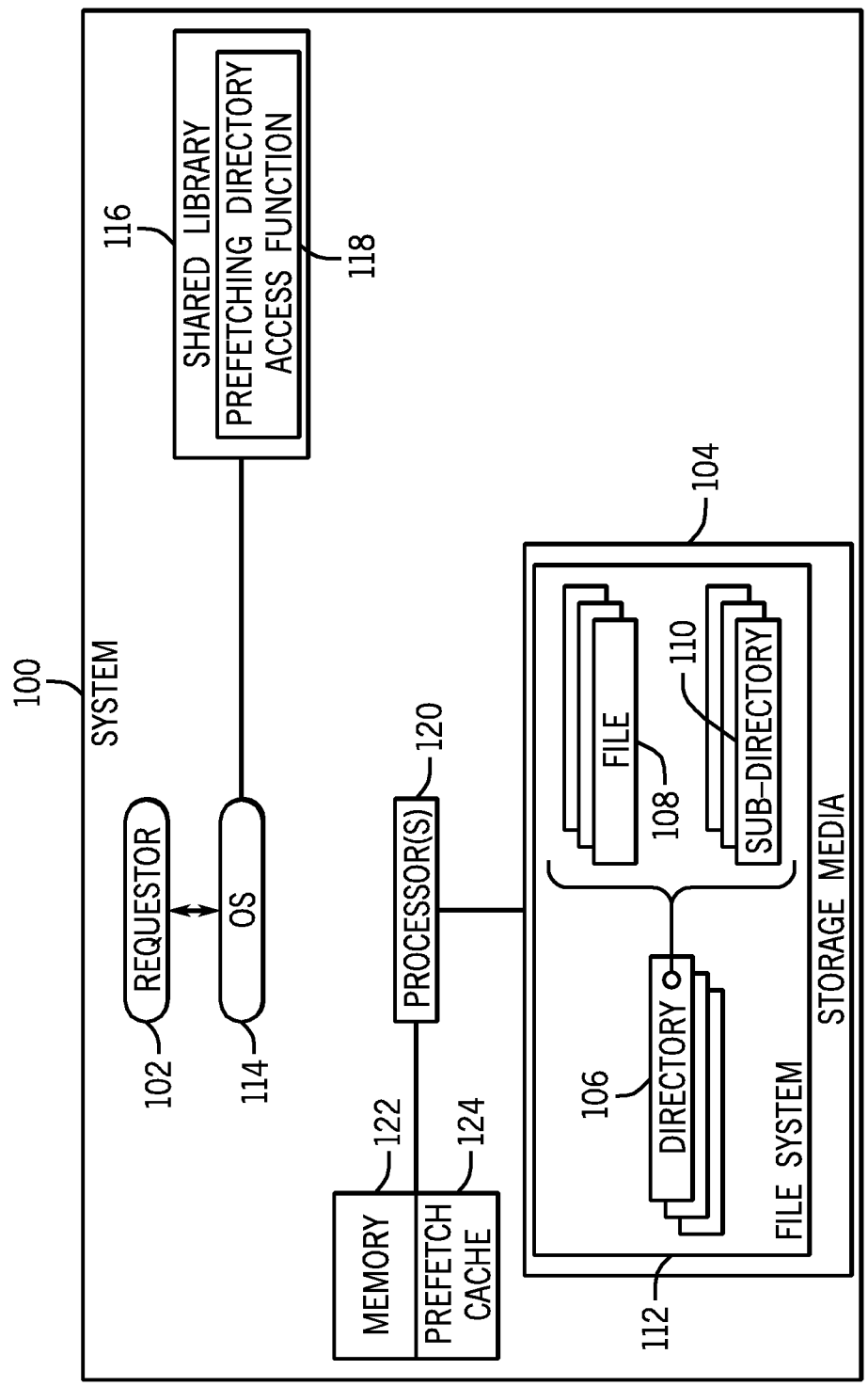
FIG. 1 is a block diagram of a system incorporating some implementations.

To enhance access speeds to data in a system, prefetching of data can be performed. Prefetching refers to a process in which data that is not yet requested is retrieved in advance from a slower storage medium to store in a faster storage medium. Later, when the prefetched data is requested, such data can be quickly retrieved from the faster storage medium, which results in the requested data being provided to the requestor at a higher speed.

Examples of slower storage media include disk-based storage devices, such as hard disk drives or optical disk drives, or semiconductor or integrated circuit storage devices such as dynamic random access memories (DRAMs) or flash memories. Often, such slower storage media provide persistent storage media in a system, where data in the persistent storage media can persist even if power is removed from the system. Examples of faster storage media include semiconductor memories such as DRAMs or static random access memories (SRAMs). Other examples of faster storage media and slower storage media are also contemplated.

Prefetching of data is especially useful for requestors that perform sequential data reading, in which sequential segments of data (e.g., files) stored on a storage medium, are sequentially accessed. Often, to enable prefetching, requestors (such as applications), kernels of operating systems, and/or file systems are modified to support the prefetching. Additionally or alternatively, special drivers may have to be added to support prefetching. However, having to modify parameters or code associated with operating system kernels, applications, and/or file systems, or having to add special drivers, can result in complexities in development of various system modules.

In accordance with some implementations, relatively efficient mechanisms are provided to support prefetching of data. The prefetching of data is supported by a special or custom directory access command that is made available to requestors of data. A "directory access command" refers to a command that is invoked by a requestor to traverse (or browse) a directory. Examples of directory access commands include a command to open a directory, a command to read a directory, a command to list content of a directory, and so forth. A directory refers to a logical storage structure in a storage arrangement (such as a file system) that includes or contains other logical storage structures, such as files or sub-directories.

A special or custom directory access command according to some implementations includes instructions to perform prefetching of content of the directory being accessed, such as the files in the directory. Such a directory access command with prefetching capabilities is also referred to as a "prefetching directory access command." A prefetching directory access command according to some implementations is contrasted with typical directory access commands that do not include instructions to perform prefetching of directory content. In some examples, instructions in a prefetching directory access command to perform prefetching of directory content include instructions to invoke a readahead( ) function, such as that provided by Linux to prefetch files in a particular list. In other examples, prefetch instructions in a prefetching directory access command can invoke other types of functions, executables, scripts, and so forth. As yet another example, the prefetch instructions in a prefetching directory access command can include code that is part of the prefetching directory access command for performing prefetching.

FIG. 1 is a block diagram of an example system 100 that incorporates some implementations. The system 100 can be a computer, a storage server (which manages storage of data in one or multiple storage devices), a backup server (to control the backup of data), an indexing server (to create indexes of data), a data-mining server (to perform analysis of data), a cloning/mirroring server (to copy or mirror data from one storage device to another storage device), or any other type of system that is capable of accessing data in slower storage media 104 (which can be the persistent storage media of the system 100).

The system 100 includes a requestor 102, which can be an application or some other type of requestor. Although the requestor 102 is depicted as being part of the system 100, in some implementations, the requestor 102 can be located on a system that is remote from the system 100. Also, there can be multiple requestors 102.

The requestor 102 is able to issue requests for data stored in the storage media 104, which can include one or multiple disk-based storage device(s) and/or one or multiple semiconductor or integrated storage device(s). The storage media 104 is configured to store data, which can be in the form of directories 106, with each directory including files 108 and possibly sub-directories 110. In some examples, the directories 106, files 108, and sub-directories 110 can be part of a file system 112, which is a mechanism to store and organize data in files.

The system 100 further includes an operating system 114. In some examples, the operating system 114 can be a Linux operating system. In other examples, the operating system can be another type of operating system, such as a Unix operating system, or other type of operating system.

A shared library 116 (or other storage location) can be provided in the system 100, where the shared library 116 is a collection of data and code that provides services to programs, such as the requestor 102. The shared library 116 can be stored in the storage media 104 or stored in another storage media. In accordance with some implementations, the shared library 116 includes a prefetching directory access function 118 that is invocable to perform an access of a directory, such as browsing a directory, opening a directory, listing the content of the directory, etc. In accordance with some implementations, the prefetching directory access function 118 also performs prefetching of content of the directory that is being accessed. The prefetching directory access function 118 is in the form of a routine or other code that is invoked in response to a request from the requestor 102 to access a directory. The prefetching directory access function 118 is an example of a command that can be invoked to access the directory (with prefetching), in response to a request from the requestor 102. More generally, reference is made to a "prefetching directory access command," which can be any type of code sequence invoked in response to a request to access a directory from the requestor 102. Although just one prefetching directory access function 118 is depicted in FIG. 1, in other examples of multiple prefetching directory access functions can be provided in the shared library 108.

The prefetching directory access function(s) 118 can be preloaded in the system 100 (before installation of application(s) that make up the requestor(s) 102). By preloading prefetching directory access function(s) in the shared library 116 (or other storage location), recompilation or modification of an application (or applications) does not have to be performed for the application(s) to use the prefetching directory access function(s). In this way, the prefetching directory access function(s) can be automatically used whenever the application(s) request(s) access of directories.

In a system in which the operating system 114 is a Linux operating system, the prefetching directory access function 118 can be an opendir( ) function (which opens a directory stream corresponding to a directory name specified by the opendir( ) function). More specifically, the opendir( ) function obtains a handle of the directory, such that another function, such as readdir( ), can subsequently be invoked to read the content of the directory. Alternatively, the prefetching directory access function 118 can be an fdopendir( ) function, which is similar to the opendir( ) function except that the directory is specified by a file descriptor rather than by a name. In accordance with some implementations, the opendir( ) function or fdopendir( ) function 118 is a modified form of the respective Linux opendir( ) function or fdopendir( ) function, with the modification including instructions added to the opendir( ) or fdopendir( ) function to perform prefetching of content of an accessed directory specified by the function.

In other examples, other types of functions (modified from typical directory access functions) can be used, depending on the type of operating system 114 implemented in the system 100.

The system 100 also includes one or multiple processors 120, which is (are) connected to the storage media 104 and a memory 122. The memory 122 is implemented with a storage medium that has a higher access speed than an access speed of the storage media 104. At least a portion of the memory 122 can be used to provide a prefetch cache 124, where the prefetch cache 124 is used to store data prefetched by the prefetching directory access function 118. Once data is prefetched into the prefetch cache 124, a subsequent request can be satisfied by retrieving requested data from the prefetch code 124, if the requested data is present in the prefetch cache 124, in which case the subsequent request does not have to wait for data to be retrieved from the slower storage media 104.

In some implementations, in addition to storing prefetched data, the memory 122 can also be used to store various data and instructions associated with general operations in the system 100. An available portion of the memory 122 (where the available portion is a portion not used for storing data or instructions of general operations of the system) can be used as the prefetch cache 124. In some examples, the size of the prefetch cache 124 can dynamically change based on usage of the memory 122 due to operations in the system 100. If the operating system 114 already has a mechanism to manage the prefetch cache 124, then use of the prefetching directory access function 118 to prefetch content of an accessed directory can leverage such mechanism, resulting in further efficiency.

In alternative implementations, the memory used for the prefetch cache 124 can be separate from memory used for storing data and instructions associated with other operations in the system 100.

By using prefetching directory access commands, such as the prefetching directory access function 118 of FIG. 1 according to some implementations, prefetching of data can be performed without having to modify existing applications, modify operating system kernels, add special drivers, and/or modify file systems. Consequently, by performing prefetching of data using the prefetching directory access commands according to some implementations, system performance (due to prefetching of data) can be enhanced without unduly adding complexity to the system 100.

Figure 2:
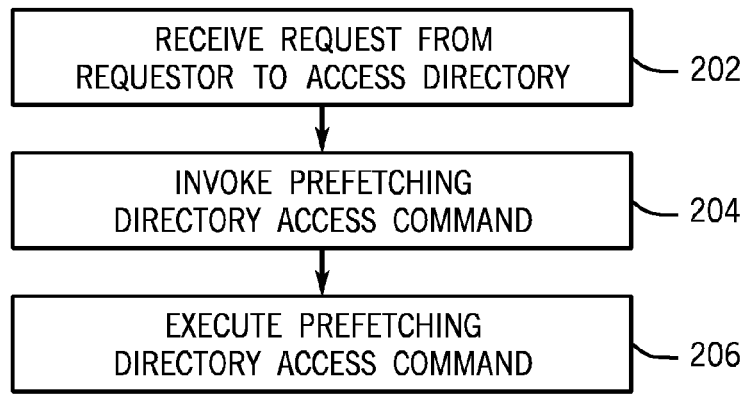
FIG. 2 is a flow diagram of a process of accessing data, according to some implementations.

FIG. 2 is a flow diagram of a process according to some implementations. A request from the requestor 102 (FIG. 1) is received (at 202) to access a directory. In response to the request, a prefetching directory access command, such as the prefetching directory access function 118 in FIG. 1, is invoked (at 204). The directory access command includes instructions to prefetch content of the directory. Tasks 202 and 204 can be performed by the operating system 114 or by some other module in the system 100.

The prefetching directory access command is executed (at 206) to access the directory and to prefetch the content of the directory. In some implementations, all files inside the accessed directory are prefetched. In other implementations, a subset of the files inside the directory is prefetched. The subset can be selected based on some criterion, such as a criterion specifying a certain amount of data to prefetch, and/or a criterion relating to the available size of the prefetch cache 124 (FIG. 1), and/or some other criterion.

In some examples, the file system 112 is designed to have minimal or reduced data fragmentation. As a result, such file system 112 allows for file data to be stored in a contiguous sequence of data blocks on the storage media 104. In such implementations, the prefetching of the content of a directory can be performed according to an order that is based on locations of first data blocks of respective files. Each file within a directory is made up of one or multiple data blocks. The location of the first data block of each file is known, and such location of the first data block of each file can be used for ordering the sequence of prefetching the files within the directory. In examples where the storage media 104 is implemented as a disk-based storage media, and the file system 112 provides reduced data fragmentation, the ordering of access of files according to locations of their first data blocks allows for faster file access times, since less time is spent seeking files to retrieve on the storage media.

The foregoing discussion assumes that the requestor 102 is anticipated to retrieve content of a directory that the requestor accesses. That may not be true of some requestors. A different requestor may traverse a directory without reading the files in the directory. For example, a requestor can access a directory for finding a particular file (without reading the particular file) or may access a directory for the purpose of performing incremental backups (in which data is backed up only when the data has changed from a previous version). For requestors that may traverse a directory without reading actual files in the directory, prefetching the files of the directory would likely be wasted effort.

Figure 3:
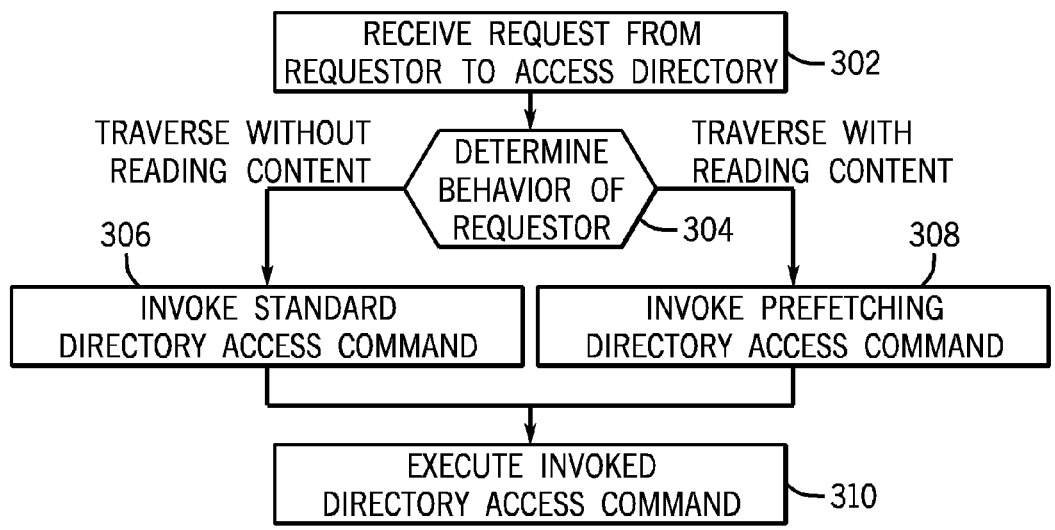
FIG. 3 is a flow diagram of a process of accessing data, according to alternative implementations.

FIG. 3 is a flow diagram of a process according to alternative implementations that addresses the foregoing issues. A request from a requestor to access a directory is received (at 302). The process then determines (at 304) a behavior of the requestor, namely whether the requestor that issued the request (1) typically traverses directories without reading content (e.g., files) of the directories, or (2) typically reads content (e.g., files) of a directory that the requestor traverses.

The determination can be performed by the operating system 114 or by some other module. The determination can be based on accessing information associated with the requestor (for example, information regarding the type of requestor which can indicate whether or not the requestor is likely to traverse a directory followed by reading the content of the directory). For example, the information associated with each of multiple requestors can be determined in advance, such as by testing the behavior of the requestors, such that specific prefetching behaviors (in response to directory traversing) can be predetermined for each of the requestors. The information associated with each behavior can then specify the predetermined prefetching behavior to use. Alternatively, the determination can be dynamically performed based on observed past behavior of the requestor. The system 100 can monitor the behavior of different requestors, and can store information pertaining to behaviors of the requestors in log files. From such monitored past behaviors, the system 100 can determine whether or not a requestor typically traverses directories without performing content access, or typically traverses directories with content access. As yet another alternative, a hybrid approach can be used in which "analytics" can be performed for some time duration (e.g., several hours or days) during initial running of the system to observe the behavior of requestors, with the observed behavior used to determine the prefetching behavior of the requestors in later runs.

In response to a determination that the requestor typically traverses directories without performing content access, the process of FIG. 3 invokes (at 306) a standard directory access command, where the standard directory access command is a command to access the directory without performing prefetching.

On the other hand, in response to determining (at 304) that the requestor typically traverses directories with content access, the process of FIG. 3 invokes (at 308) a prefetching directory access command, which accesses the specified directory and performs prefetching of content (e.g., files) in the directory.

The invoked directory access command is executed (at 310).

By tying prefetching into a directory access command, the prefetching mechanism according to some implementations can be reused for each of multiple directory accesses. The approach of tying prefetching into a directory access command allows an application or other requestor to enable prefetching without modifications of the application (or other requestor) or of underlying layers such as the operating system, driver layer, or file system.

Machine-readable instructions of modules described above (including modules 102, 114, 116, and 118 of FIG. 1) are loaded for execution on one or multiple processors (such as 120 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, in a system having a processor, a request from a requestor to access a given directory;
determining whether the requestor has previously traversed directories without reading content of the directories, or the requestor has previously read content of the directories the requestor traversed;
in response to determining that the requestor has previously read content of the directories the requestor traversed,
invoking a first directory access command in the system in response to the request, wherein the first directory access command includes instructions to prefetch content of the given directory, and
executing the first directory access command to access the given directory and to prefetch the content of the given directory; and
in response to determining that the requestor has previously traversed the directories without reading content of the directories,
invoking, in response to the request, a second directory access command that is without instructions to prefetch content of the given directory, and
executing the second directory access command to access the given directory.

2. The method of claim 1, wherein invoking the first directory access command in the system comprises invoking the first directory access command from a library in the system.

3. The method of claim 2, further comprising preloading the library in the system to allow an application to invoke the first directory access command without having to first recompile or modify the application.

4. The method of claim 1, wherein executing the first directory access command to prefetch the content of the given directory comprises:
   determining locations of first data blocks of respective files in the given directory; and
   prefetching the files in an order according to the determined locations of the first data blocks.

5. The method of claim 1, wherein prefetching the content of the given directory comprises prefetching the content of the given directory into a cache.

6. The method of claim 1, further comprising:
   monitoring behavior of the requestor in accessing the directories,
   wherein the determining is based on the monitoring.

7. A system comprising:
   a processor;
   a module to receive a request from a requestor, wherein the request is to access a given directory,
   wherein the module is to:
      determine whether the requestor has previously traversed directories without reading content of the directories, or the requestor has previously read content of the directories the requestor traversed;
      in response to determining that the requestor has previously read content of the directories the requestor traversed, invoke a prefetching directory access command in response to the request; and
      in response to determining that the requestor has previously traversed the directories without reading content of the directories, invoke, in response to the request, a second directory access command that is without instructions to prefetch content of the given directory,
   wherein the processor is to one of execute the invoked prefetching directory access command that accesses the given directory and prefetches content of the given directory, or execute the second directory access command that traverses the given directory without prefetching content of the given directory.

8. The system of claim 7, wherein the module comprises an operating system.

9. The system of claim 7, wherein the prefetching directory access command includes instructions to perform prefetching of content of the given directory.

10. The system of claim 9, further comprising a library containing the prefetching directory access command, wherein the library is accessible by the requestor.

11. The system of claim 7, further comprising persistent storage media and a memory containing a prefetch cache to store prefetched data that is retrieved from the persistent storage media by the executed prefetching directory access command.

12. The system of claim 11, wherein a size of the prefetch cache is dynamically variable during operation of the system.

13. The system of claim 7, wherein the executed prefetching directory access command performs prefetching by:
   determining locations of first data blocks of respective files in the given directory; and
   prefetching the files in an order according to the determined locations of the first data blocks.

14. The system of claim 7, wherein the prefetching directory access command contains an instruction to invoke a readahead command to perform the prefetching of content of the given directory.

15. A system of claim 7, wherein the module is to monitor behavior of the requestor in accessing the directories, wherein the determining is based on the monitoring.

16. An article comprising at least one computer-readable storage medium containing instructions that upon execution cause a system having a processor to:
   receive a request from a requestor to access a given directory;
   determine whether the requestor has previously traversed directories without reading content of the directories, or the requestor has previously read content of the directories the requestor traversed;
   in response to determining that the requestor has previously read content of the directories the requestor traversed,
      invoke a first directory access command in the system in response to the request, wherein the first directory access command includes instructions to prefetch content of the given directory, and
      execute the first directory access command to access the given directory and to prefetch the content of the given directory; and
   in response to determining that the requestor has previously traversed the directories without reading content of the directories,
      invoke, in response to the request, a second directory access command that is without instructions to prefetch content of the given directory, and
      execute the second access command to access the given directory.

17. The article of claim 16, wherein the execution of the first directory access command to prefetch the content of the given directory comprises:
   determining locations of first data blocks of respective files in the given directory; and
   prefetching the files in an order according to the determined locations of the first data blocks.

18. The article of claim 16, wherein the instructions upon execution cause the system to further:
   monitor behavior of the requestor in accessing the directories,
   wherein the determining is based on the monitoring.

* * * * *